United States Patent [19]

Becerra-Novoa et al.

[11] Patent Number: 4,734,128
[45] Date of Patent: Mar. 29, 1988

[54] DIRECT REDUCTION REACTOR WITH HOT DISCHARGE

[75] Inventors: Jorge-Octavio Becerra-Novoa, Apodaca; Ronald-Victor-Manuel Lopez-Gomez, San Nicolas de los Garza; Carlos Dominguez-Ahedo, San Pedro Garza Garcia; Leobardo Chapa-Martinez, San Nicolas de los Garza, all of Mexico

[73] Assignee: Hylsa, S.A., Monterrey, Mexico

[21] Appl. No.: 779,390

[22] Filed: Sep. 23, 1985

[51] Int. Cl.$^4$ .............................................. C21B 13/02
[52] U.S. Cl. ......................................................... 75/35
[58] Field of Search ....................................... 75/34, 35

[56] References Cited

U.S. PATENT DOCUMENTS

| | | |
|---|---|---|
| 3,375,099 | 3/1968 | Marshall ................................. 75/35 |
| 3,392,008 | 7/1968 | Wald ......................................... 75/34 |
| 4,002,422 | 1/1977 | Ecott ....................................... 432/99 |
| 4,054,444 | 10/1977 | Clark et al. ............................. 75/35 |
| 4,224,057 | 9/1980 | Martinez-Vera et al. ............... 75/35 |
| 4,270,739 | 10/1980 | Ahrendt et al. ....................... 266/156 |

Primary Examiner—Melvyn J. Andrews
Attorney, Agent, or Firm—A. Thomas S. Safford

[57] ABSTRACT

A method is disclosed for the gaseous reduction of iron ore to sponge iron at a given degree of carburization and yet at a temperature suitable for hot briquetting or for direct feed to a melter or to a refining furnace. The desired percentage of carburization and the preferred elevated temperature are achieved by using a hot blend of recycled reducing gas and essentially uncracked natural gas or methane to carburize and to decrease the temperature of the sponge iron in the cooling zone of the reactor.

9 Claims, 4 Drawing Figures

DIRECT REDUCTION REACTOR WITH HOT DISCHARGE

FIELD OF THE INVENTION

This invention relates to a process for the direct gaseous reduction of iron ore to produce sponge iron, and more particularly, to an improved method and apparatus for producing hot sponge iron for briquetting while still at relatively high temperatures, for feeding hot directly to a refining furnace or to a melter, or the like.

BACKGROUND OF THE INVENTION

Typical gaseous reduction systems incorporating vertical shaft, moving bed iron ore reduction reactors, are disclosed in U.S. Pat. Nos. 3,765,872; 3,770,421; 3,779,741; and 3,816,102. In such systems reduction of the ore has commonly been effected by a reducing gas largely composed of carbon monoxide and hydrogen obtained by catalytic reformation of a mixture of natural gas and steam. Such systems, typically, comprise a vertical shaft reactor having a reducing zone in the upper portion thereof and a cooling zone in the lower portion thereof. The ore to be reduced is fed to the top of the reactor and flows downwardly therethrough, first through the reducing zone wherein it is brought into contact with hot reducing gas and then through a cooling zone wherein it is cooled by a gaseous coolant before being removed at the bottom of the reactor. Effluent gas from the reducing zone is cooled to remove water therefrom and in most cases, a major part of the cooled effluent gas is reheated and recycled to the reducing zone. Similarly, at least a part of the coolant gas withdrawn from the cooling zone is commonly cooled and recycled to the cooling zone to cool the sponge iron to, or close to, the ambient temperature. At its lower end the reactor is provided with some means for controlling the discharge of the cooled sponge iron from the reactor, e.g. a rotary discharge valve, a vibratory chute, conveyor belt, or the like.

It is often desirable to discharge the sponge iron at high temperature for direct delivery to a steel refining furnace or, when the hot sponge iron cannot be used immediately, then to a melter or to a machine for briquetting the hot sponge iron product produced in such a reactor. Direct reduced iron in the form of briquettes is easier to handle and transport than when it is in the form of the more porous, friable, and smaller sponge iron particles. Also, briquetting of the sponge iron reduces the tendency to re-oxidize when stored in contact with atmospheric air. However, as noted above, the conventional reactors deliver the sponge iron at a temperature at or near ambient temperature. Densification of the product by briquetting at such low temperatures is difficult to achieve, requires high pressures, tends to produce friable products, and an undesirably high proportion of fines. As a practical matter the sponge iron should be relatively near the sintering temperature to produce briquettes having acceptable physical properties.

The production of sponge iron at a temperature suitable for hot briquetting is not just a matter of operating the cooling zone of a conventional reactor at a higher temperature. The cooling zone of the reactor performs not only a cooling function, but also serves as a carburizing zone to bring the sponge iron to a predetermined desired carbon content, which is preferably in the form of ferric carbide rather than elemental carbon (such as soot). With natural gas being used, as one of the possible sources of carbon for carburizing the sponge iron, the natural gas and the conditions within the cooling zone must be so maintained as to give the degree of carburization needed for the desired sponge iron product. Typically, carburization of from 1% to 4% is desired. In a non-stoichiometric reformer of the type shown in U.S. Pat. No. 4,370,162, the maximum obtainable carburization of sponge iron from the reducing zone would be about 0.5%.

Additionally, a briquetting of the hot sponge iron, preferably, should be done at above about 700° C. Below this temperature for most types of sponge iron the pressures typically required are too great and the wear of the briquetting equipment becomes excessive. Also, it becomes too difficult to densify the sponge iron adequately. A briquette with a density of at least 5 $gm/cm^3$ is desirable for convenience of handling and for passivation. Dense briquettes have decreased exposed surface, lower porosity, and are less prone to fragmentation and fines generation.

OBJECTS OF THE INVENTION

Accordingly, it is an object of the invention to provide a process for producing hot sponge iron having a predetermined degree of carburization and metallization.

It is another object of the invention to provide a method of producing sponge iron having desirable properties for hot briquetting.

It is a further object of the invention to provide an improved method of producing briquetted sponge iron.

Other objects of the invention will be obvious in part, and in part pointed-out hereafter.

SUMMARY OF THE INVENTION

The objects of the invention are achieved in general by circulating through the lower modifying zone of the reactor a carbon-containing gas that has a temperature sufficiently above the ambient temperature to cause the sponge iron to leave the reactor at a suitable temperature. For hot briquetting the lower limit would range from 600° to 800° C. A particular lower briquetting temperature limit for this range will depend upon the properties of the specific sponge iron produced. A higher temperature is desirable for energy efficiency when the hot sponge iron is fed directly to an electric arc refining furnace or to a melter or the like. In addition to the temperature control, the carbon-containing gas must have the proper composition to produce the desired carburization of the sponge iron in the lower modifying zone. These twin objectives can be attained in accordance with the invention by withdrawing from the reducing gas loop a portion of the hot gas stream fed to the reduction zone of the reactor and mixing the withdrawn stream at or near the reactor with a stream of methane (typically, in the form of natural gas) which is at a lower temperature (below the methane cracking temperature) to form a blended carburizing gas for use in the lower zone of the reactor.

The properly carburized hot sponge iron product can be discharged at a temperature on the order of 900° C.; where the end use, for example, is for direct feed to a steel refining furnace.

For convenience in claiming the present process, the several gas streams will be numbered, with the first gas stream being the gas circulated in the reducing gas loop, the second gas stream being the make-up reducing gas to said reducing gas loop, the third gas stream being the gas withdrawn from the reducing gas loop for carburizing gas formation, and the fourth stream being the natural gas mixed with the third stream to form the carburizing gas.

BRIEF DESCRIPTION OF THE DRAWINGS

In this specification and the accompanying drawings, applicants have shown and described several preferred embodiments of their invention and have suggested various alternatives and modifications thereto, but it is to be understood that these are not intended to be exhaustive and that many changes and modifications can be made within the scope of the invention. These suggestions herein are selected and included for purposes of illustration in order that others skilled in the art will more fully understand the invention and principles thereof and will thus be enabled to modify it and embody it in a variety of forms, each as may be best suited to the conditions of a particular use.

DETAILED DESCRIPTION

Figure 1:
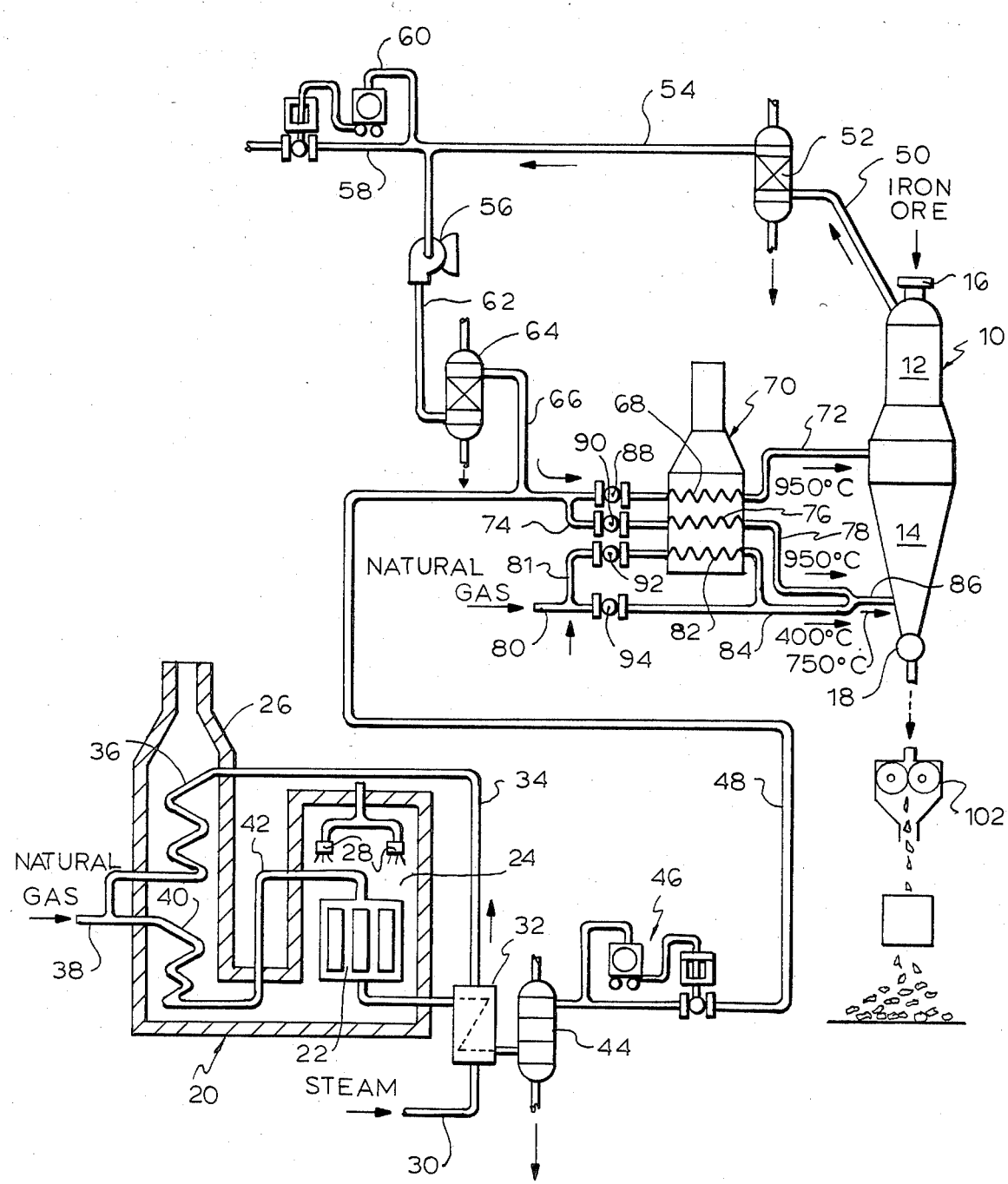
FIG. 1 diagrammatically illustrates an apparatus capable of being used to carry out the invention and shows a preferred embodiment of the invention (here utilized for hot briquetting) in which a portion of the hot reducing gas stream is mixed with the natural gas stream to form the blended carburizing stream.

Referring to the drawings and, particularly, to the right-hand side of FIG. 1, the numeral 10 generally designates a vertical shaft reactor having a reduction zone 12 in the upper portion thereof and a carburizing-temperature regulating zone 14 in the lower portion thereof. Ore to be reduced enters the top of the reactor through a connection 16 and is reduced to sponge iron by a hot reducing gas in the zone 12. The sponge iron is suitably carburized and partially cooled, if needed to give the optimal hot discharge temperature, in the modifying zone 14 and leaves the reactor through a discharge valve 18.

Referring to the lower left-hand portion of FIG. 1, reducing gas to reduce the ore is generated in known manner in a reformer unit 20 by the catalytic conversion of a mixture of steam and natural gas (mainly methane) to a reducing gas largely composed of carbon monoxide and hydrogen. The reformer comprises a bank of catalyst-filled tubes 22 located in a heating chamber 24 that communicates with a stack 26. The catalyst tubes are externally heated by hot combustion products that are produced by the burners 28 and leave the reformer through the stack 26.

Steam to form the steam/methane mixture enters the system through a pipe 30 and flows through a heat exchanger 32 in heat exchange relationship with the catalyst tube exit gases, thence through pipe 34 to a coil 36 in stack 26 wherein it is further heated. Upon leaving the stack 26, the steam is mixed with methane that enters the system through pipe 38. The steam/methane mixture is heated in a coil 40 within stack 26 and flows through pipe 42 to the catalyst tubes 22 wherein it is converted to carbon monoxide and hydrogen as noted above. The thus formed reducing gas gives up part of its heat to the entering steam in heat exchanger 32 and is then dewatered by quench-cooling in a cooler 44, whence it passes through a flow controller 46 to the make-up gas supply pipe 48 that leads to a reducing gas loop in the upper portion of FIG. 1, now to be described.

In ore reduction systems of the general type here shown, it is customary to recycle a considerable part of the reducing gas passing through the reduction zone of the reactor. Still referring to FIG. 1, spent gas leaving the reduction zone 12 thus flows in a loop through pipe 50 to a quench cooler 52 wherein it is cooled and dewatered, then through pipe 54 to a compressor 56. A portion of the recycled gas is withdrawn from the loop through pipe 58 containing a back pressure regulator 60 and is transferred to a suitable point of storage or use or is vented to the atmosphere. The regulator 60 serves to maintain the reactor 10 and associated equipment at a desired pressure.

From the discharge of blower 56 the recycled gas flows successively through a pipe 62, a carbon dioxide removal unit 64, pipe 66, a coil 68 of a heater 70 wherein it is heated to a temperature of approximately 900° C. to 950° C. and a pipe 72 that conducts the hot reducing gas to the bottom of the zone 12 to complete the reducing gas loop. As shown in FIG. 1, the fresh reducing gas from the reformer 20 flows through pipe 48 to pipe 66 where it is mixed with the recycle gas, and the blend of recycle gas and fresh gas is heated in heater 70 before being fed to zone 12 of reactor 10.

In order to produce sponge iron at a temperature suitable for hot briquetting in accordance with the illustrated variant of the present invention, the carburizing gas used in zone 14 of the reactor is at a temperature higher than the cooling gases normally employed in prior systems of this type. The carburizing gas used is formed by blending a portion of the recycle gas that is at a relatively high temperature and a stream of natural gas or methane that is at a lower non-cracking temperature than the recycle stream. Reverting to FIG. 1, a portion of the recycle gas is diverted through pipe 74 and flows through coil 76 of heater 70 to pipe 78. Natural gas or methane is supplied through pipe 80 and may flow through coil 82 of heater 70 and/or through bypass pipe 83 to pipe 84. The hot recycle gas stream in pipe 78 at a temperature of approximately 950° C. and the natural gas stream in pipe 84 advantageously heated to a temperature below the cracking temperature of natural gas, e.g. 400° C., are blended in short pipe 86 and the mixture is introduced into the modifying zone 14, preferably, at about 750° C. and flows upwardly therein to carburize the sponge iron and to lower its temperature to the desired briquetting level.

To avoid excessive soot accumulating in the pipes from cracking of natural gas at temperatures above about 400° C., and to avoid associated corrosion, either the concentration of natural gas is kept very low in the hotter pipes, or the pipes containing substantial amounts of natural gas are kept below about 400° C. The reducing gas at 950° C. in pipe 78 and the natural gas at 400° C. in pipe 84 are not combined in pipe 86 until just before reaching the sponge iron bed in the reactor. Thus, pipe 86 is preferably quite short.

As shown in FIG. 1, the gas flows to heater 70 may be regulated by valve 88 in pipe 66, valve 90 in pipe 74, valve 92 in pipe 81, and valve 94 in pipe 84. The regulating valves are desirably located on the "cold side" of heater 70 to avoid exposing them to the high temperatures of the heater exit gases.

Hot sponge iron is removed at the bottom of the reactor 10, and is then charged by suitable means (not shown) to a conventional briquetting device 102.

Preferably, in a commercial installation three sets of lock hoppers, each with a corresponding briquetting unit, are provided below the reactor 10. In this arrangement there may be a diverting valve in the discharge pipe from discharge valve 18, which will direct the sponge iron product from the reactor, successively, to each of the briquetting machines. These are designed so that the reactor can be run at full capacity by operating only two of the briquetting machines. This provides flexibility for maintenance, etc. by leaving one spare unit for stand-by.

Figure 1A:
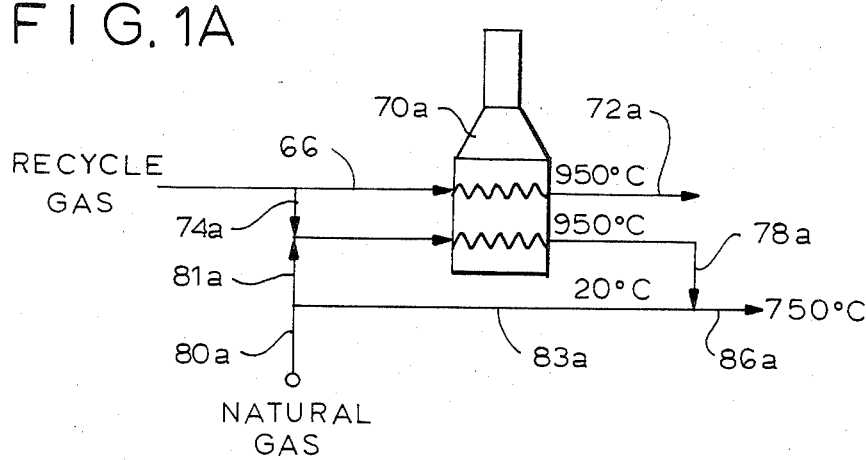
Figures 1A, 1B and 1C are fragmentary diagrams indicating alternative flow paths through the heater for the components of the blended carburizing gas.
Figure 1B:
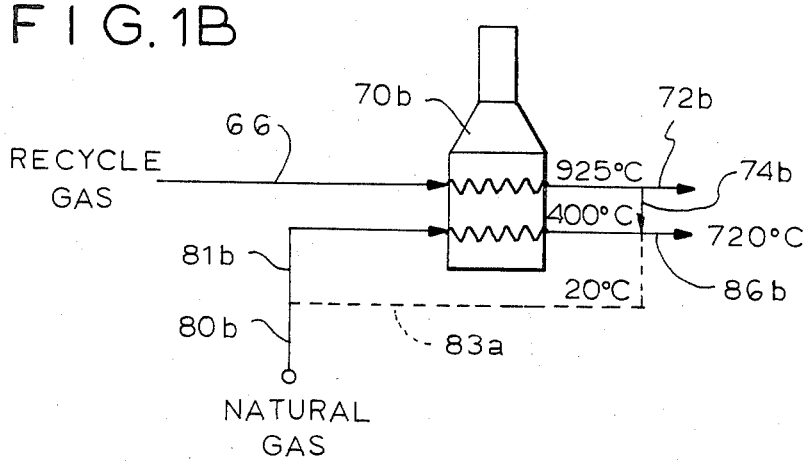
Figure 1C:
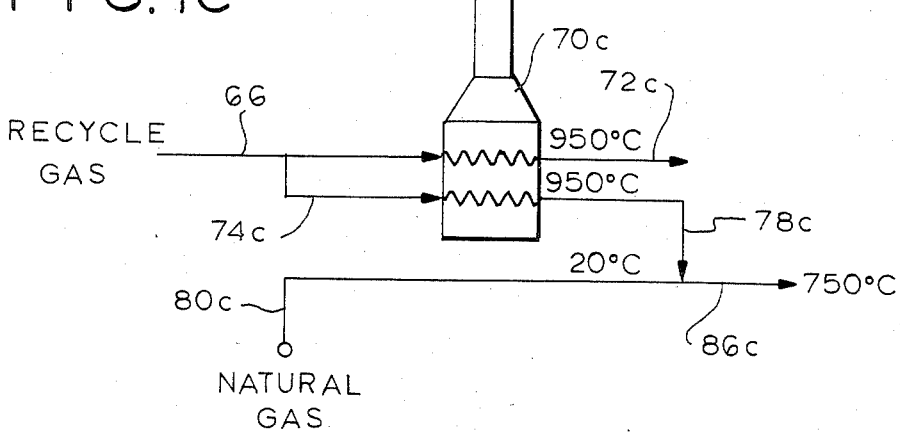

Turning now to FIGS. 1A, 1B and 1C, these Figures indicate several modifications of the system of FIG. 1 that may be used. In FIG. 1A, a small part of the natural gas stream from pipe 81a can be mixed with the diverted recycle gas stream from pipe 74a without significant detrimental effect (the small amount of oxidants in the recycle gas tending to inhibit the cracking of the small amount of natural gas present in pipe 74a), the resulting mixture is heated to approximately 950° C. and the hot mixture from pipe 78a is blended with cold natural gas from pipe 83a to form a mixture at about 750° C. that is then fed via pipe 86a to the zone 14.

In FIG. 1B, the flow is similar to that of FIG. 1, except that the recycle gas stream to be blended with the natural gas stream is diverted from the main recycle stream after it has been heated rather than before heating. This option is exemplary of a particular modification and upgrading that has been done to practice this embodiment of the invention in an existing sponge iron plant.

In the example of this embodiment of the process shown in FIG. 1B, a 50 ton/hr reactor producing sponge iron with 92% metallization and 1% carbon combines recycle gas from pipe 66 with fresh make-up gas from pipe 48 in an appropriate flow ratio of 3 to 1. The resulting combined flow heated to 925° C. and amounting to about 95,000 NCMH is split with a portion being combined with about 2300 NCMH of natural gas at 400° C. to give a resulting gas injection through pipe 86b at 720° C., over half of which is $H_2$ and over a quarter of which is $CH_4$.

FIG. 1B also indicates by a dotted line 83 the possibility of adding cold natural gas to the mixture of hot recycle gas and heated natural gas. This gives flexibility in adjusting the flow ratio of the natural gas to hot recycle gas in pipe 86 to give the desired temperature.

In FIG. 1C the diverted stream of recycle gas is heated and then mixed with cold natural gas to form a coolant gas at the desired temperature. Modifications other than those shown in FIGS. 1A, 1B and 1C will be apparent to those skilled in the art. Also the temperatures given are intended to be illustrative and may be substantially varied.

From the foregoing description it should be apparent that the present invention provides a preferred method of making hot briquetted sponge iron that meets the several objectives given above. By using as a cooling medium a blend of recycle gas and natural gas or methane at an elevated temperature, the desired carburization of the sponge iron can be effected and the sponge iron can be discharged from the reactor at a temperature suitable for hot briquetting.

In its broader aspects, the invention is also applicable to producing properly carburized sponge iron at temperatures on the order of 900° C. for direct feeding to a steel refining furnace, a melter, etc.

We claim:

1. A process for producing hot sponge iron from a particulate iron ore in a vertically arranged, moving bed reactor having a reduction zone in the upper portion thereof forming part of a reducing gas loop through which a reducing gas is circulated and a modifying zone in the lower portion thereof for adjusting at least one of the properties of temperature and of carbon content of the sponge iron formed in said reduction zone, which process comprises supplying ore to be reduced to the upper portion of said reducing zone, circulating a first gas stream largely composed of carbon monoxide and hydrogen through said loop, heating said first gas stream before it enters said reducing zone and cooling and de-watering it after it leaves said reducing zone, feeding to said loop a second gas stream comprising make-up gas largely composed of carbon monoxide and hydrogen, removing from said loop a portion of the circulating gas as a third gas stream, heating and then mixing said third stream with a fourth stream of a carbon-containing gas having a temperature below that of said third stream to form a hot carburizing gas mixture causing said mixture to flow upwardly through the modifying zone of the reactor with said mixture having been blended so as to be effective to modify the carbon composition of the sponge iron passing therethrough to between 1% and 4% by weight and to adjust the temperature of the sponge iron to between 600° C. and 900° C., and removing modified hot sponge iron at the bottom of said reactor.

2. A process according to claim 1 wherein the third and fourth streams are separately heated before being mixed, and said mixture is then fed to said modifying zone.

3. A process according to claim 1 wherein at least a portion of said fourth stream is mixed with said third stream and said mixture is thereafter heated before being fed to said modifying zone.

4. A process according to claim 3 wherein only a part of said fourth stream is mixed with said third stream prior to heating and the remainder of said fourth stream is added to the mixture after said mixture has been heated.

5. A process according to claim 1 wherein the third stream is removed from said loop after said first stream has been heated and is then mixed with said fourth stream.

6. A process according to claim 5 wherein said fourth stream is separately heated before being added to said third stream.

7. A process according to claim 1 wherein said first and third streams are separately heated and said third stream is mixed with an unheated fourth stream.

8. A process according to one of the preceding claims, wherein said fourth stream is essentially natural gas with a temperature below the cracking temperature of natural gas, and said third and fourth streams are blended at or closely adjacent to said modifying zone.

9. A process according to claim 8 wherein said hot sponge iron is briquetted at between 700° C. and 800° C.

* * * * *